(12) United States Patent
Sakata

(10) Patent No.: US 10,451,174 B2
(45) Date of Patent: Oct. 22, 2019

(54) ROBOT AND GEAR DEVICE

(71) Applicant: Seiko Epson Corporation, Tokyo (JP)

(72) Inventor: Masaaki Sakata, Matsumoto (JP)

(73) Assignee: Seiko Epson Corporation (JP)

( * ) Notice: Subject to any disclaimer, the term of this patent is extended or adjusted under 35 U.S.C. 154(b) by 51 days.

(21) Appl. No.: 15/658,798

(22) Filed: Jul. 25, 2017

(65) Prior Publication Data

US 2018/0031108 A1  Feb. 1, 2018

(30) Foreign Application Priority Data

Jul. 29, 2016 (JP) .................................. 2016-149796
May 15, 2017 (JP) .................................. 2017-096344

(51) Int. Cl.
*F16H 57/04* (2010.01)
*B25J 9/10* (2006.01)
(Continued)

(52) U.S. Cl.
CPC .......... *F16H 57/048* (2013.01); *B25J 9/1025* (2013.01); *C22C 37/00* (2013.01); *C22C 38/44* (2013.01); *F16H 49/001* (2013.01); *F16H 55/06* (2013.01); *F16H 57/041* (2013.01); *F16H 57/0486* (2013.01); *F16H 55/17* (2013.01); *F16H 57/0464* (2013.01); *F16H 2055/176* (2013.01)

(58) Field of Classification Search
CPC ...... F16H 55/06; F16H 57/048; F16H 49/001; F16H 55/17; F16H 57/041; F16H 57/0486; F16H 57/0464; F16H 2055/176; F05C 2201/0409; F05C 2201/0451

USPC .......................................... 74/320, 467, 468
See application file for complete search history.

(56) References Cited

U.S. PATENT DOCUMENTS 6,082,222 A * 7/2000 Kiyosawa ............. F16H 49/001
                                                           219/76.1
6,615,689 B2 * 9/2003 Kobayashi .............. F16C 33/30
                                                            74/640

(Continued)

FOREIGN PATENT DOCUMENTS

JP      60-155324 A     8/1995
JP      2002-340140 A   11/2002
(Continued)

OTHER PUBLICATIONS

Extended European Search Report for Application No. EP 17 18 3492 dated Jan. 3, 2018 (6 pages).

*Primary Examiner* — Jake Cook
*Assistant Examiner* — Gregory Robert Weber
(74) *Attorney, Agent, or Firm* — Harness, Dickey & Pierce, P.L.C.

(57) ABSTRACT

A robot includes a first member, a second member provided to be capable of turning with respect to the first member, and a gear device configured to transmit a driving force from one side to the other side of the first member and the second member. The gear device includes internal teeth and external teeth provided halfway in a transmission path of the driving force and configured to mesh with each other and lubricant disposed between the internal teeth and the external teeth. An average grain size of a constituent material of the external teeth is smaller than an average grain size of a constituent material of the internal teeth.

5 Claims, 8 Drawing Sheets

(51) Int. Cl.
*F16H 55/06* (2006.01)
*C22C 38/44* (2006.01)
*C22C 37/00* (2006.01)
*F16H 49/00* (2006.01)
*F16H 55/17* (2006.01)

(56) References Cited

U.S. PATENT DOCUMENTS

| | | | | |
|---|---|---|---|---|
| 7,716,838 | B2* | 5/2010 | Kobayashi | B22F 5/10 |
| | | | | 29/898.06 |
| 7,748,118 | B2* | 7/2010 | Kobayashi | F16H 49/001 |
| | | | | 29/893 |
| 8,136,420 | B2* | 3/2012 | Satou | F16C 19/46 |
| | | | | 74/434 |
| 8,940,109 | B2 | 1/2015 | Nagata et al. | |
| 9,874,273 | B2* | 1/2018 | Kobayashi | C21D 6/002 |
| 9,970,086 | B2* | 5/2018 | Mouri | F01L 1/3442 |
| 10,151,377 | B2* | 12/2018 | Hofmann | F16H 49/001 |
| 2002/0174741 | A1 | 11/2002 | Kobayashi | |
| 2002/0178861 | A1 | 12/2002 | Kobayashi | |
| 2002/0184968 | A1 | 12/2002 | Kobayashi et al. | |
| 2013/0000788 | A1 | 1/2013 | Nagata et al. | |
| 2015/0240930 | A1 | 8/2015 | Kobayashi et al. | |
| 2016/0136819 | A1* | 5/2016 | Kitahara | B65G 47/90 |
| | | | | 414/749.1 |
| 2018/0180154 | A1* | 6/2018 | Gilges | B62D 5/008 |
| 2018/0274646 | A1* | 9/2018 | Sato | F16H 49/001 |

FOREIGN PATENT DOCUMENTS

| | | | |
|---|---|---|---|
| JP | 2002-349681 A | | 12/2002 |
| JP | 2005-320604 A | | 11/2005 |
| JP | 2006-083905 A | | 3/2006 |
| JP | 2006083905 A | * | 3/2006 |
| JP | 2015-161346 A | | 9/2015 |
| WO | WO-2011-122315 A1 | | 10/2011 |

* cited by examiner

ROBOT AND GEAR DEVICE

BACKGROUND

1. Technical Field

The present invention relates to a robot and a gear device.

2. Related Art

In a robot including a robot arm including at least one arm, for example, a joint section of the robot arm is driven by a motor. However, in general, rotation by a driving force (torque) from the motor is reduced by a reduction gear. As the reduction gear, for example, a gear device such as a wave gear device described in JP-A-2002-349681 (Patent Literature 1) is known.

The wave gear device described in Patent Literature 1 includes a rigid internal gear formed in an annular shape, a flexible external gear formed in an annular shape, and a wave generator that partially meshes the external gear with the internal gear in the radial direction and moves a position of the meshing in the circumferential direction. Grease is filled in tooth surface portions of the internal gear and the external gear.

In the wave gear device described in Patent Literature 1, the internal gear and the external gear mesh with each other with an extremely small backlash. There has been a problem in that the lubrication life of lubricant in such a meshing portion is short and, when the wave gear device is used in a robot, seizure, wear, and the like occur relatively early.

SUMMARY

An advantage of some aspects of the invention is to provide a robot and a gear device in which the lubrication life of lubricant used in the gear device can be effectively improved.

The advantage can be achieved by the following configurations.

A robot according to an aspect of the invention includes: a first member; a second member provided to be capable of turning with respect to the first member; and a gear device configured to transmit a driving force from one side to the other side of the first member and the second member. The gear device includes: internal teeth and external teeth provided halfway in a transmission path of the driving force and configured to mesh with each other; and lubricant disposed between the internal teeth and the external teeth. An average grain size of a constituent material of the external teeth is smaller than an average grain size of a constituent material of the internal teeth.

According to the robot, it is possible to reduce the grain size of the external teeth and make it easy to retain the lubricant on the external teeth. Therefore, it is possible to keep the lubricant on the external teeth against a centrifugal force due to rotation of the external teeth. On the other hand, it is possible to increase the grain size of the internal teeth and cause the lubricant to easily flow along the internal teeth. Therefore, it is possible to prevent the lubricant from inclining to one side and solidifying on the internal teeth. A synergistic effect of two effects, that is, the effect of keeping the lubricant on the external teeth and the effect of preventing the lubricant from inclining to one side and solidifying on the internal teeth makes it possible to effectively improve the lubrication life of the lubricant.

In the robot according to the aspect, it is preferable that the average grain size of the constituent material of the internal teeth is within a range of 20 μm or more to 150 μm or less.

With this configuration, it is possible to more effectively cause the lubricant to flow along the internal teeth. When the internal teeth are made of metal, it is possible to improve mechanical strength of the internal teeth.

In the robot according to the aspect, it is preferable that the average grain size of the constituent material of the external teeth is within a range of 0.5 μm or more to 30 μm or less.

With this configuration, it is possible to more effectively retain the lubricant on the external teeth. When the external teeth are made of metal, it is possible to improve mechanical strength of the external teeth.

In the robot according to the aspect, it is preferable that the internal teeth and the external teeth are respectively made of metal materials.

In general, metal has an excellent mechanical characteristic, can be relatively easily machined, and has high machining accuracy. Therefore, it is possible to easily realize the internal teeth and the external teeth having excellent characteristics (mechanical strength, accuracy, and the like).

In the robot according to the aspect, it is preferable that the internal teeth are made of either one of cast iron and precipitation hardening type stainless steel.

With this configuration, it is possible to easily realize the internal teeth having excellent characteristics (mechanical strength, accuracy, and the like). In particular, the cast iron and the precipitation hardening type stainless steel respectively easily realize appropriate grain sizes for effectively causing the lubricant to flow along the internal teeth and are excellent in a balance of mechanical strength and machinability. Therefore, when the internal teeth are made of either one of the cast iron and the precipitation hardening type stainless steel, it is possible to more effectively cause the lubricant to flow along the internal teeth while improving the mechanical strength of the internal teeth.

In the robot according to the aspect, it is preferable that the external teeth are made of any one of nickel-chrome molybdenum steel, maraging steel, and precipitation hardening type stainless steel.

With this configuration, it is possible to easily realize the external teeth having excellent characteristics (mechanical strength, accuracy, and the like). In particular, the nickel-chrome molybdenum steel, the maraging steel, and the precipitation hardening type stainless steel respectively easily realize appropriate grain sizes for effectively retaining the lubricant on the external teeth and are excellent in a balance of mechanical strength and machinability. Therefore, when the external teeth are made of any one of the nickel-chrome molybdenum steel, the maraging steel, and the precipitation hardening type stainless steel, it is possible to more effectively retain the lubricant on the external teeth while improving the mechanical strength of the external teeth.

In the robot according to the aspect, it is preferable that the gear device includes: an internal gear including the internal teeth; a flexible external gear including the external teeth that partially mesh with the internal gear; and a wave generator configured to bend the external gear and move a meshing position of the internal gear and the external gear in a circumferential direction.

In the gear device, in general, the internal gear and the external gear mesh with each other with an extremely small backlash. Therefore, a request for the lubrication life of the lubricant is extremely high. Therefore, when the invention is applied to the gear device, an effect of improving the lubrication life of the lubricant is conspicuous.

A gear device according to an aspect of the invention includes: an internal teeth and an external teeth configured to mesh with each other; and lubricant disposed between the internal teeth and the external teeth. An average grain size of a constituent material of the external teeth is smaller than an average grain size of a constituent material of the internal teeth.

According to the gear device, it is possible to effectively improve the lubrication life of the lubricant.

BRIEF DESCRIPTION OF THE DRAWINGS

The invention will be described with reference to the accompanying drawings, wherein like numbers reference like elements.

DESCRIPTION OF EXEMPLARY EMBODIMENTS

A robot and a gear device of the invention are explained in detail below with reference to preferred embodiments shown in the accompanying drawings.

1. Robot

First, an embodiment related to a robot according to the invention is explained.

Figure 1:
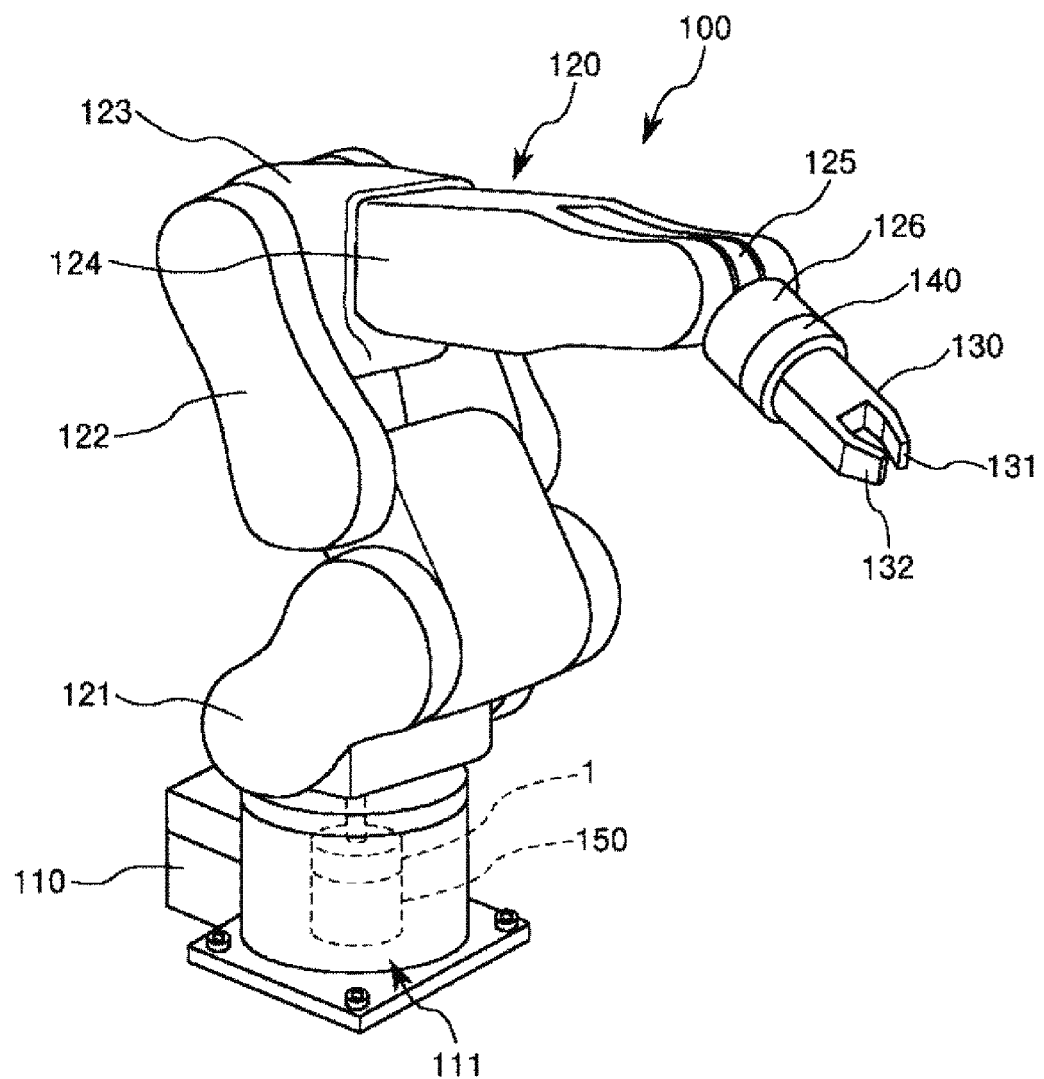
FIG. 1 is a diagram showing a schematic configuration of a robot according to an embodiment of the invention.

FIG. 1 is a diagram showing a schematic configuration of the embodiment of the robot according to the invention.

A robot 100 shown in FIG. 1 can perform work such as supply, removal, conveyance, and assembly of a precision instrument and components (target objects) configuring the precision instrument.

The robot 100 is a six-axis vertical multi-joint robot and includes a base 111, a robot arm 120 connected to the base 111, and a force detector 140 and a hand 130 provided at the distal end portion of the robot arm 120. The robot 100 includes a control device 110 that controls a plurality of driving sources (including a motor 150 and a gear device 1) that generate power for driving the robot arm 120.

The base 111 is a portion for installing the robot 100 in any setting place. Note that a setting place of the base 111 is not particularly limited. Examples of the setting place include a floor, a wall, a ceiling, and a movable truck.

The robot arm 120 includes a first arm 121 (an arm), a second arm 122 (an arm), a third arm 123 (an arm), a fourth arm 124 (an arm), a fifth arm 125 (an arm), and a sixth arm 126 (an arm). The arms are coupled in this order from a proximal end side (a base side) toward a distal end side. The first arm 121 is connected to the base 111. The hand 130 (an end effector) that grips various components and the like is detachably attached to the distal end of the sixth arm 126. The hand 130 includes two fingers 131 and 132 and can grip the various components and the like with the fingers 131 and 132.

In the base 111, a driving source including the motor 150 such as a servomotor that drives the first arm 121 and the gear device 1 (a reduction gear) is provided. Although not shown in the figure, in the arms 121 to 126, a plurality of driving sources including motors and reduction gears are respectively provided. The driving sources are controlled by the control device 110.

In the robot 100, the gear device 1 transmits a driving force from one to the other of the base 111 (a first member) and the first arm 121 (a second member). More specifically, the gear device 1 transmits, from the base 111 side to the first arm 121 side, a driving force for turning the first arm 121 with respect to the base 111. The gear device 1 can decelerate the rotation by the driving force and turn the first arm 121 with respect to the base 111 by functioning as a reduction gear. Note that the "turn" includes moving in one direction or in both directions including the one direction and the opposite direction of the one direction with respect to a certain center point and rotating with respect to the certain center point.

In this way, the robot 100 includes the base 111, which is the "first member", the first arm 121, which is the "second member", provided to be capable of turning with respect to the base 111, and the gear device 1 that transmits the driving force from one side to the other side of the base 111 (the first member) and the first arm 121 (the second member). Note that any number of arms selected in order from the first arm 121 side among the second to sixth arms 122 to 126 may be grasped as the "second member". That is, a structure including the first arm 121 and any number of arms selected in order from the first arm 121 side among the second to sixth arms 122 to 126 can be considered the "second member". For example, a structure including the first and second arms 121 and 122 can be considered the "second member". The entire robot arm 120 can be considered the "second member". The "second member" may include the hand 130. That is, a structure including the robot arm 120 and the hand 130 can be considered the "second member".

Since the robot 100 explained above includes the gear device 1 explained below, it is possible to effectively improve the lubrication life of lubricant used in the gear device 1.

2. Gear Device

Embodiments related to a gear device according to the invention are explained below.

First Embodiment

Figure 2:
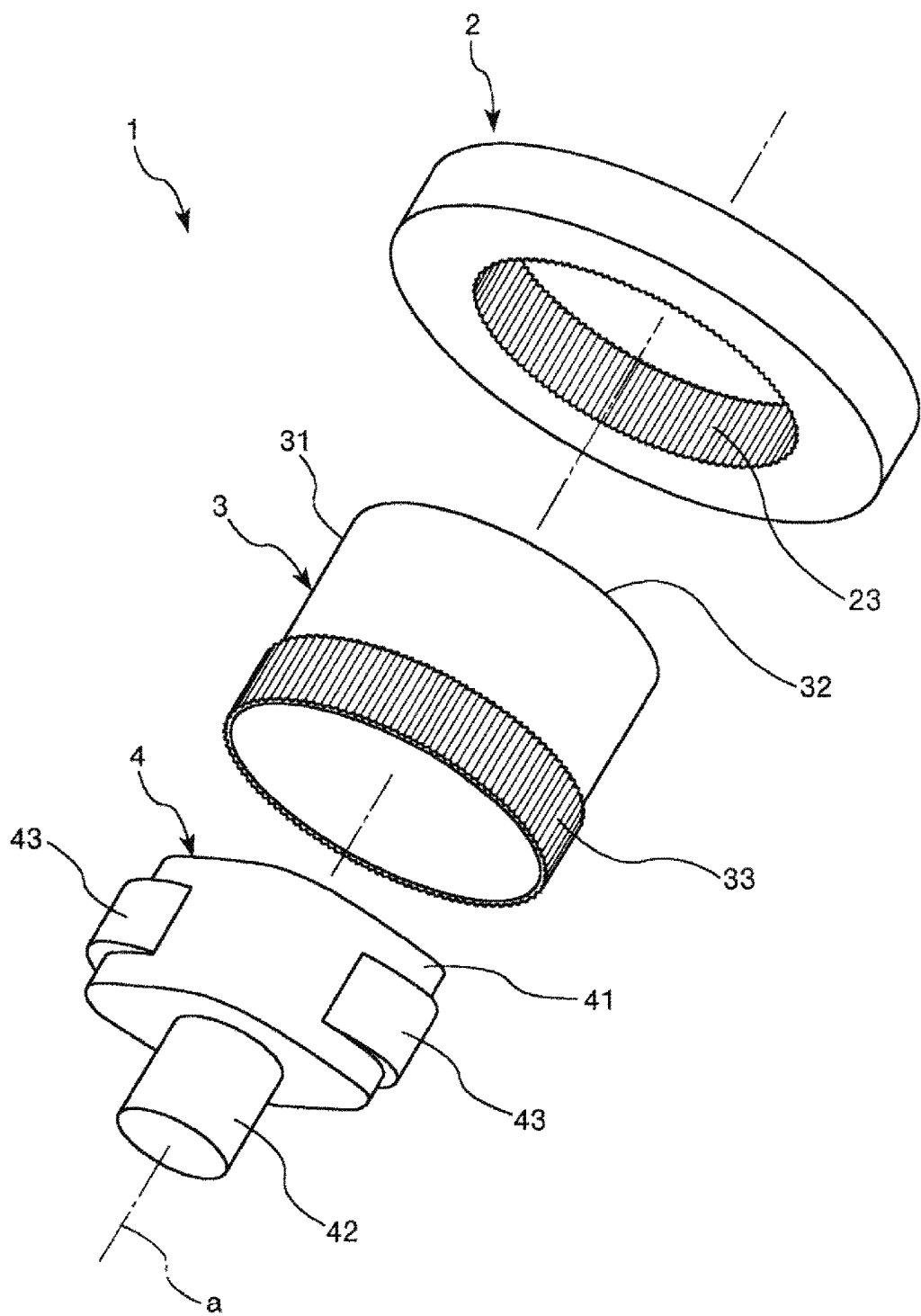
FIG. 2 is an exploded perspective view showing a gear device according to a first embodiment of the invention.
Figure 3:
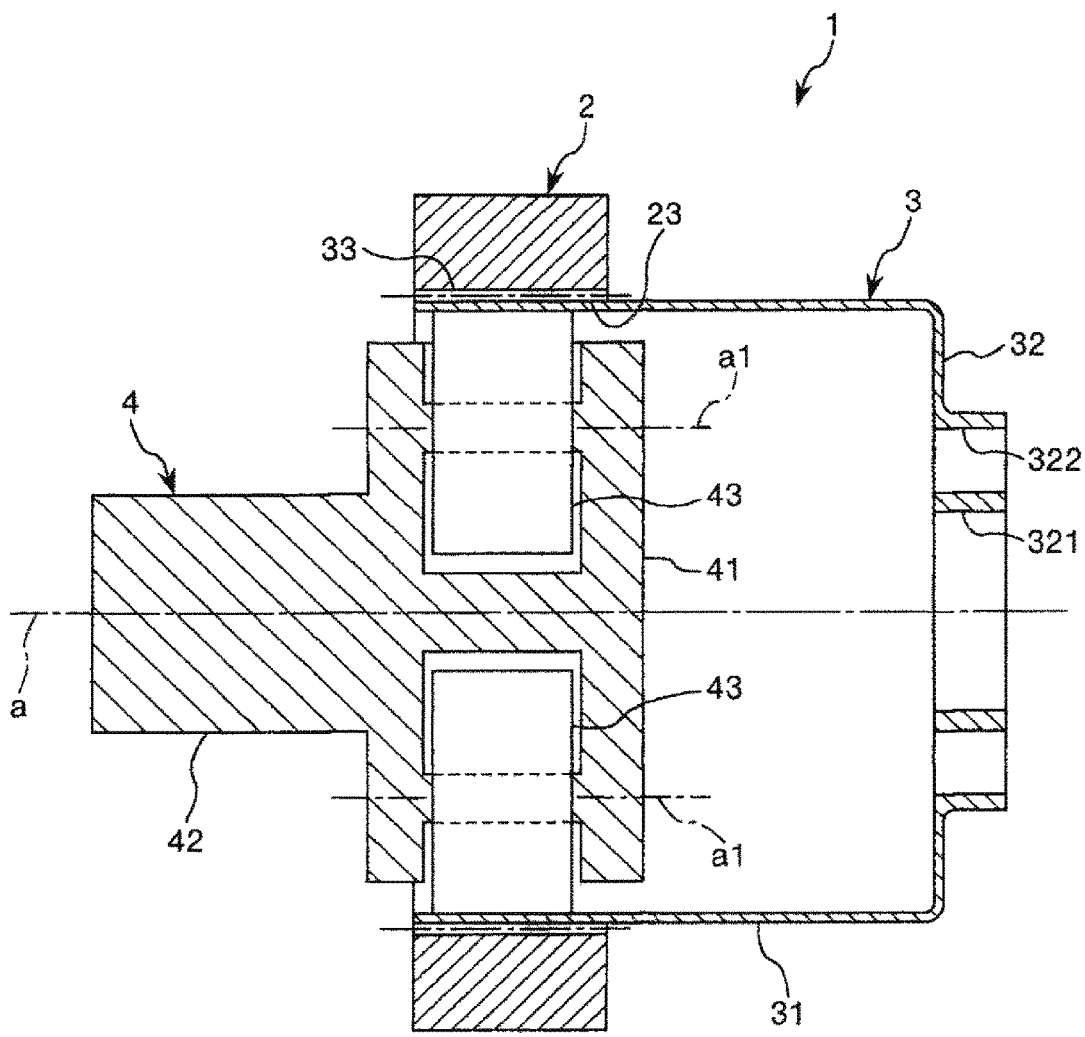
FIG. 3 is a longitudinal sectional view of the gear device shown in FIG. 2.
Figure 4:
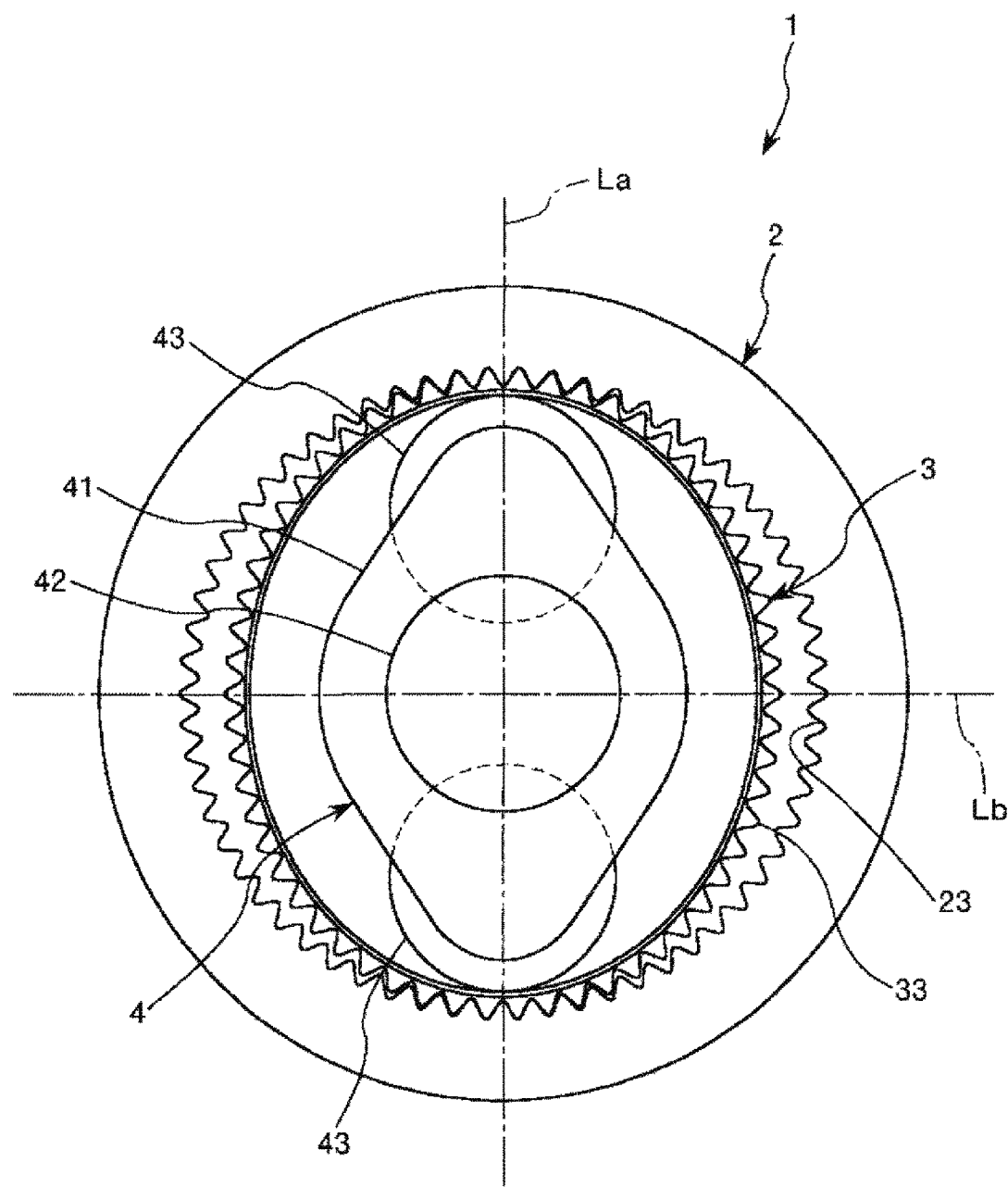
FIG. 4 is a front view of the gear device shown in FIG. 2.

FIG. 2 is an exploded perspective view showing a gear device according to a first embodiment of the invention. FIG. 3 is a longitudinal sectional view of the gear device shown in FIG. 2. FIG. 4 is a front view of the gear device shown in FIG. 2. Note that, in the figures, for convenience of explanation, dimensions of sections are exaggerated as appropriate according to necessity. Dimension ratios among the sections do not always coincide with actual dimension ratios.

The gear device 1 shown in FIGS. 2 to 4 is a wave gear device and is used as, for example, a reduction gear. The gear device 1 includes a rigid gear 2, which is an internal gear, a flexible gear 3, which is a cup-type external gear, disposed on the inner side of the rigid gear 2, and a wave generator 4 disposed on the inner side of the flexible gear 3.

The gear device 1 includes a portion where a lateral cross section of the flexible gear 3 is deformed in an elliptical shape or an oval shape by the wave generator 4. The flexible gear 3 meshes with the rigid gear 2 at both end portions on a major axis side of the portion. The numbers of teeth of the rigid gear 2 and the flexible gear 3 are different from each other.

In this embodiment, the rigid gear 2 is fixed to the base 111 (first member) side of the robot 100. The flexible gear 3 is fixed to the first arm 121 (second member) side of the robot 100. The wave generator 4 is connected to a rotating shaft side of the motor 150 of the robot 100.

In the gear device 1, for example, when a driving force (e.g., a driving force from the motor 150) is input to the wave generator 4, the rigid gear 2 and the flexible gear relatively rotate around an axis "a" because of the number-of-teeth difference while a meshing position of the rigid gear 2 and the flexible gear 3 moves in the circumferential direction. Consequently, it is possible to decelerate rotation by the driving force (torque) input to the wave generator 4 from the driving source and output the driving force from the flexible gear 3. That is, it is possible to realize a reduction gear in which the wave generator 4 is on an input shaft side and the flexible gear 3 is on an output shaft side.

Note that a connection form of the rigid gear 2, the flexible gear 3, and the wave generator 4 is not limited to the form explained above. For example, even when the flexible gear 3 is fixed to the base 111 side and the rigid gear 2 is fixed to the first arm 121 side, the gear device 1 can be used as the reduction gear. Even when the flexible gear 3 is connected to the rotating shaft side of the motor 150, the gear device 1 can be used as the reduction gear. In this case, the wave generator 4 only has to be fixed to the base 111 side and the rigid gear 2 only has to be connected to the first arm 121 side. When the gear device 1 is used as a speed-increasing gear (when the rotation by the input driving force is increased in speed), a relation between the input side (the motor 150 side) and the output side (the first arm 121 side) only has to be reversed.

The configuration of the gear device 1 is briefly explained below.

As shown in FIGS. 2 to 4, the rigid gear 2 is a gear configured by a rigid body that substantially does not bend in the radial direction and is a ring-shaped internal gear including internal teeth 23. In this embodiment, the rigid gear 2 is a spur gear. That is, the internal teeth 23 include tooth traces parallel to the axis "a".

The flexible gear 3 is inserted through the inner side of the rigid gear 2. The flexible gear 3 is a gear having flexibility deflectively deformable in the radial direction and is an external gear including external teeth 33 (teeth) that mesh with the internal teeth 23 of the rigid gear 2. The number of teeth of the flexible gear 3 is smaller than the number of teeth of the rigid gear 2. Since the numbers of teeth of the flexible gear 3 and the rigid gear 2 are different from each other in this way, it is possible to realize the reduction gear.

In this embodiment, the flexible gear 3 is formed in a cup shape opening at one end. The external teeth 33 are formed at an end portion on the opening side. The flexible gear 3 includes a tubular (more specifically, cylindrical) trunk section 31 (a cylinder section) formed around the axis "a" and a bottom section 32 connected to one end portion side in the axis "a" direction of the trunk section 31. Consequently, it is possible to allow an end portion on the opposite side of the bottom section 32 of the trunk section 31 to easily bend in the radial direction. Therefore, it is possible to realize satisfactory deflective meshing of the flexible gear 3 with respect to the rigid gear 2. It is possible to increase the rigidity of the end portion on the bottom section 32 side of the trunk section 31. Therefore, it is possible to stably connect the input shaft or the output shaft to the bottom section 32.

As shown in FIG. 3, a hole 321 piercing though the bottom section 32 along the axis "a" and a plurality of holes 322 piercing through the bottom section 32 around the hole 321 are formed in the bottom section 32. A shaft body on the output side can be inserted through the hole 321. The holes 322 can be used as screw holes through which screws for fixing the shaft body on the output side to the bottom section 32 are inserted. Note that the holes only have to be provided as appropriate and can be omitted.

As shown in FIG. 3, the wave generator 4 is disposed on the inner side of the flexible gear 3 and is capable of rotating the axis "a". The wave generator 4 deforms a lateral cross section of a portion of the flexible gear 3 on the opposite side of the bottom section 32 into an elliptical shape or an oval shape having a major axis La and a minor axis Lb and meshes the external teeth 33 with the internal teeth 23 of the rigid gear 2 (see FIG. 4). The flexible gear 3 and the rigid gear 2 are meshed with each other on the inside and the outside to be capable of rotating around the same axis "a".

In this embodiment, the wave generator 4 includes a main body section 41, a shaft section 42 projecting from the main body section 41 along the axis "a", and a pair of rollers 43 provided to be capable or rotating around an axis "a1", which is parallel to the axis "a", with respect to the main body section 41. In the wave generator 4, the pair of rollers 43 expands the flexible gear 3 from the inner side while rolling on the inner circumferential surface of the flexible gear 3. The main body section 41, the shaft section 42, and the pair of rollers 43 are capable of rotating around the axis "a". Therefore, for example, when a driving force is input to the wave generator 4 from the driving source, the meshing position of the rigid gear 2 and the flexible gear 3 moves in the circumferential direction.

The configuration of the gear device 1 is briefly explained above. In the gear device 1, as explained above, for example, when the driving force (e.g., the driving force from the motor 150) is input to the wave generator 4, the rigid gear 2 and the flexible gear 3 relatively rotate around the axis "a" because of the number-of-teeth difference while the meshing position of the rigid gear 2 and the flexible gear 3 moves in the circumferential direction. Lubricant is used in order to reduce wear of the sections of the gear device 1. The gear device 1 has a configuration explained below in order to maintain the lubricant in a satisfactory state for a long period in the meshing portion of the rigid gear 2 and the flexible gear 3.

Figure 5:
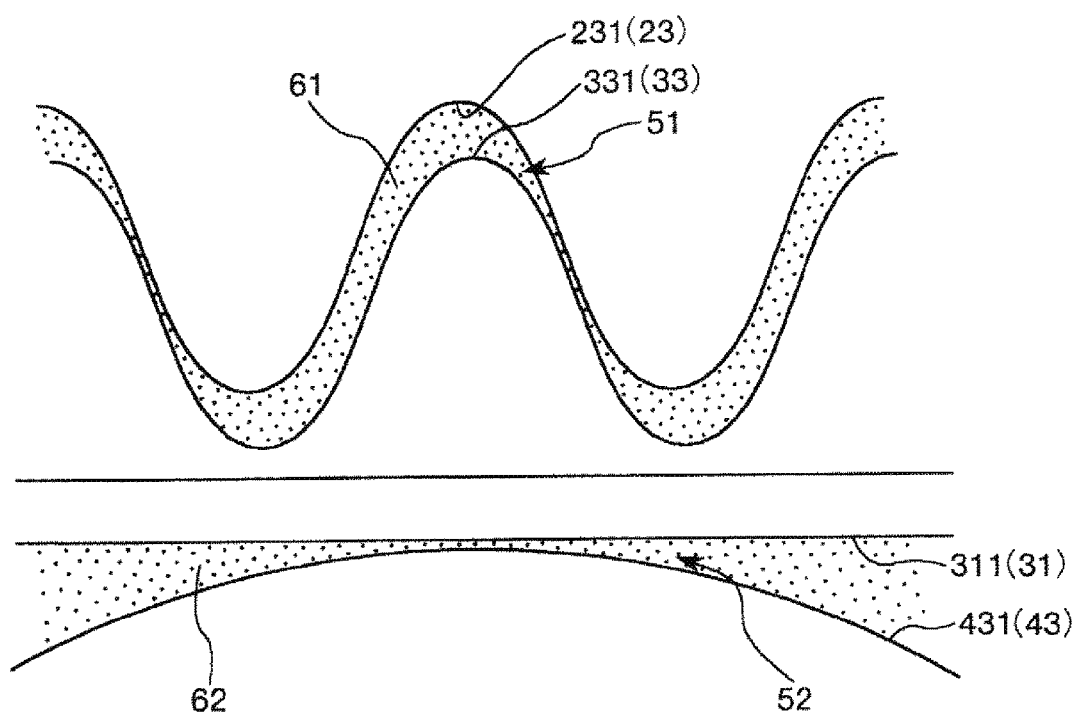
FIG. 5 is a diagram for explaining lubricant disposed in a meshing section and a sliding section of the gear device shown in FIG. 2.

FIG. 5 is a diagram for explaining lubricant disposed in a meshing section and a sliding section of the gear device shown in FIG. 2.

As explained above, the gear device 1 includes the rigid gear 2, which is the "internal gear", including the internal teeth 23, the flexible gear 3, which is the flexible "external gear", including the external teeth 33 that partially mesh with the internal teeth 23, and the wave generator 4 that bends the flexible gear 3 and moves the meshing position of the rigid gear 2 and the flexible gear 3 in the circumferential direction. As shown in FIG. 5, lubricant 51 is disposed in a meshing section 61, which is a region between a teeth surface 231 of the internal teeth 23 of the rigid gear 2 and a teeth surface 331 of the external teeth 33 of the flexible gear 3. That is, the gear device 1 includes the internal teeth 23 and the external teeth 33 provided halfway in a transmission path of the driving force (e.g., the driving force from the motor 150) and configured to mesh with each other and the lubricant 51 disposed between the internal teeth 23 and the external teeth 33. "Halfway in the transmission path of the driving force" refers to any position between a start point and an end point of the transmission path of the driving force.

The internal teeth 23 and the external teeth 33 are respectively made of metal materials explained below and include crystal grains in a metal structure of the metal material. An average grain size of the constituent material of the external teeth 33 is smaller than an average grain size of the constituent material of the internal teeth 23.

It is possible to reduce the grain size of the external teeth 33 according to such a size relation between the average grain sizes of the constituent materials of the internal teeth 23 and the external teeth 33 and make it easy to retain the lubricant 51 on the external teeth 33. Therefore, it is possible to keep the lubricant 51 on the external teeth 33 against a centrifugal force due to rotation of the external teeth 33. The lubricant 51 is preferentially retained in a grain boundary present on the surface of the external teeth 33. This is considered to be because the grain boundary plays a role of a fine recess or groove that stores the lubricant 51. Therefore, when the grain size of the external teeth 33 is reduced, the density of the grain boundary present on the surface of the external teeth 33 increases. The lubricant 51 is easily retained on the surface of the external teeth 33 according to the increase in the density of the grain boundary.

When the grain size of the external teeth 33 is reduced, it is possible to increase the mechanical strength of the external teeth 33 and increase the toughness of the external teeth 33. The external teeth 33 repeat deformation according to the movement of the meshing position of the rigid gear 2 and the flexible gear 3 as explained above. Therefore, high mechanical strength and high toughness are requested for the external teeth 33 compared with the internal teeth 23. Therefore, it is extremely useful to increase the mechanical strength and the toughness of the external teeth 33. Note that, in general, the mechanical strength of metal increases in inverse proportion to the ½ power of a grain size.

On the other hand, it is possible to increase the grain size of the internal teeth 23 and cause the lubricant 51 to easily flow along the internal teeth 23. Therefore, it is possible to prevent the lubricant 51 from inclining to one side and solidifying on the internal teeth 23. Since the internal teeth 23 do not rotate, a centrifugal force does not act on the internal teeth 23 unlike the external teeth 33. Therefore, originally, the internal teeth 23 easily retains the lubricant 51. Therefore, by causing the lubricant 51 on the internal teeth 23 to easily flow, adhesion of the lubricant and oil shortage in a necessary part are prevented. Consequently, it is possible to sufficiently exhibit the performance of the lubricant 51.

In this way, in the gear device 1, it is possible to simultaneously exhibit the two effects explained above, that is, the effect of keeping the lubricant 51 on the external teeth 33 and the effect of preventing the lubricant 51 from inclining to one side or solidifying on the internal teeth 23. A synergistic effect of the two effects makes it possible to effectively improve the lubrication life of the lubricant 51. In particular, in the wave gear device like the gear device 1, in general, an internal gear and an external gear mesh with each other with an extremely small backlash. Therefore, a request for the lubrication life of lubricant is extremely high. Therefore, when the invention is applied to the gear device, an effect of improving the lubrication life of the lubricant is conspicuous.

Note that, although detailed explanation is omitted, lubricant 52 is disposed in a sliding section 62, which is a region between an inner circumferential surface 311 of the trunk section 31 of the flexible gear 3 and an outer circumferential surface 431 of the roller 43 of the wave generator 4. Although not shown in the figure, lubricant is also disposed in a sliding section in the wave generator 4.

The "average grain size" is measured according to JIS G 0551 "a microscopic examination method for steel-crystal grain size". In the measurement of the average grain size, the measurement is performed by etching the surface of a test piece (internal teeth or external teeth) with corrosive liquid to cause a grain boundary to appear and performing microscopic observation of the appearing grain boundary. 5% Nital (5% nitric acid-ethyl alcohol) is used as the corrosive liquid. The size relation between the average grain sizes explained above only has to be satisfied between at least the internal teeth 23 and the external teeth 33 and does not have to be satisfied between the other portions of the rigid gear 2 and the flexible gear 3. However, if the size relation is satisfied between the other portions as well, the effect of the size relation is conspicuous. The grain sizes of the internal teeth 23 and the external teeth 33 can be adjusted according to, for example, the materials (metal compositions) forming the internal teeth 23 and the external teeth 33 and heat treatment during manufacturing of the internal teeth 23 and the external teeth 33.

When the average grain size of the constituent material of the external teeth 33 is represented as A and the average grain size of the constituent material of the internal teeth 23 is represented as B, the average grain sizes only have to satisfy a relation A<B. However, to suitably exhibit the two effects explained above, the relation is desirably set to 1.2≤B/A≤100 and more desirably 2≤B/A≤50. On the other hand, if B/A is too small, a balance of the two effects tends to be deteriorated. If B/A is too large, a strength difference between the internal teeth 23 and the external teeth 33 is too large. One of the internal teeth 23 and the external teeth 33 tends to wear early.

The average grain size (B) of the constituent material of the internal teeth 23 is not particularly limited. However, the average grain size (B) is desirably within a range of 20 μm or more to 150 μm or less, more desirably within a range of 30 μm or more to 100 μm or less, and still more desirably within a range of 30 μm or more to 50 μm or less. Consequently, it is possible to more effectively cause the lubricant 51 to flow along the internal teeth 23. When the internal teeth 23 are made of metal, it is possible to improve the mechanical strength of the internal teeth 23. On the other hand, if the average grain size is too small, the fluidity of the lubricant 51 on the internal teeth 23 tends to decrease. If the average grain size is too large, the strength of the internal teeth 23 is sometimes insufficient depending on the constituent material of the internal teeth 23. Note that, when the range of the average grain size is satisfied in the entire rigid gear 2, the effect explained above is conspicuous.

On the other hand, the average grain size (A) of the constituent material of the external teeth 33 is not particularly limited as long as the average grain size (A) satisfies the relation A<B. However, the average grain size (A) is desirably within a range of 0.5 μm or more to 30 μm or less, more desirably within a range of 5 μm or more to 20 μm or less, and still more desirably within a range of 5 μm or more to 15 μm or less. Consequently, it is possible to more effectively retain the lubricant 51 on the external teeth 33. When the external teeth 33 is made of metal, it is possible to improve the mechanical strength of the external teeth 33. On the other hand, if the average grain size is too small, machinability in manufacturing the external teeth 33 is deteriorated. The depth of the recess due to the grain boundary present on the surface of the external teeth 33 decreases. Therefore, on the contrary, it is difficult to retain the lubricant 51 on the external teeth 33. If the average grain size is too large, the effect of retaining the lubricant 51 on the external teeth 33 tends to decrease. It is difficult to secure mechanical strength and toughness necessary for the external teeth 33. Note that, when the range of the average grain size is satisfied in the entire flexible gear 3, the effect explained above is conspicuous.

The internal teeth 23 and the external teeth 33 are respectively desirably made of metal materials. In particular, it is desirable to use iron-based materials because the iron-based materials are excellent in a mechanical characteristic and machinability and are relatively inexpensive. In general, metal has an excellent mechanical characteristic, can be relatively easily machined, and has high machining accuracy. Therefore, it is possible to easily realize the internal teeth 23 and the external teeth 33 having excellent characteristics (mechanical strength, accuracy, and the like). In particular, since the external teeth 33 desirably have high toughness as explained above, the external teeth 33 are desirably made of a metal material. Note that, since the internal teeth 23 are substantially rigid bodies, the internal teeth 23 can be made of a ceramics material. However, it is desirable to use a metal material because of a balance of the strengths of the internal teeth 23 and the external teeth 33.

The metal material of the internal teeth 23 is not particularly limited as long as the metal material satisfies the relation A<B. Various metal materials can be used. However, in particular, the metal material is desirably either one of cast iron and precipitation hardening type stainless steel. When the internal teeth 23 are made of either one of the cast iron and the precipitation hardening type stainless steel, it is possible to easily realize the internal teeth 23 having excellent characteristics (mechanical strength, accuracy, and the like). In particular, the cast iron and the precipitation hardening type stainless steel respectively easily realize the appropriate grain sizes explained above for effectively causing the lubricant 51 to flow along the internal teeth 23 and are excellent in a balance of mechanical strength and machinability. Therefore, when the internal teeth 23 are made of either one of the cast iron and the precipitation hardening type stainless steel, it is possible to more effectively cause the lubricant 51 to flow on the internal teeth 23 while improving the mechanical strength of the internal teeth 23. Note that at least the surface of the internal teeth 23 of the rigid gear 2 only has to be made of the material explained above. However, in order to make the effect explained above conspicuous, the surface to a teeth bottom section of the internal teeth 23 is desirably made of the material explained above. Further, if the entire rigid gear 2 is made of the material explained above, it is relatively easy to manufacture the rigid gear 2 while obtaining the same effect. The internal teeth 23 may be made of a material obtained by adding other substances to either one of the cast iron and the precipitation hardening stainless steel.

The metal material of the external teeth 33 is not particularly limited as long as the metal material satisfies the relation A<B. Various metal materials can be used. In particular, the metal material is desirably any one of nickel-chrome molybdenum steel, maraging steel, and precipitation hardening type stainless steel. Since the external teeth 33 are made of any one of the nickel-chrome molybdenum steel, the maraging steel, and the precipitation hardening type stainless steel, it is possible to easily realize the external teeth 33 having excellent characteristics (mechanical strength, accuracy, and the like). In particular, the nickel-chrome molybdenum steel, the maraging steel, and the precipitation hardening type stainless steel respectively easily realize the appropriate grain sizes explained above for effectively retaining the lubricant 51 on the external teeth 33 and are excellent in a balance of mechanical strength and machinability. Therefore, when the external teeth 33 are made of any one of the nickel-chrome molybdenum steel, the maraging steel, and the precipitation hardening type stainless steel, it is possible to more effectively retain the lubricant 51 on the external teeth 33 while improving the mechanical strength of the external teeth 33. Note that the surface of the external teeth 33 of the flexible gear 3 only has to be made of the material explained above. However, in order to make the effect explained above conspicuous, the surface to a teeth bottom section of the external teeth 33 is desirably made of the material explained above. Further, if the entire flexible gear 3 is made of the material explained above, it is relatively easy to manufacture the flexible gear 3 while obtaining the same effect. The external teeth 33 may be made of a material obtained by adding other substances to any one of the nickel-chrome molybdenum steel, the maraging steel, and the precipitation hardening type stainless steel.

The lubricant 51 may be either grease or lubricating oil. However, the lubricant 51 is desirably grease. That is, the lubricant 51 desirably includes base oil and a thickening agent. Consequently, the lubricant 51 can be a solid or semi-solid grease. Therefore, it is possible to easily cause the lubricant 51 to stay in a necessary place. Examples of the thickening agent include soap such as calcium soap, calcium composite soap, sodium soap, aluminum soap, lithium soap, and lithium composite soap and non-soap such as polyurea, sodium terephthalate, polytetrafluoro-ethylene (PTFE), organic bentonite, and silica gel. Among these agents, one kind can be independently used or two or more kinds can be used in combination. However, it is desirable to use the lithium soap. By using the lithium soap as the thickening agent, it is possible to improve shearing stability of the lubricant 51. It is possible to improve a balance of characteristics of the lubricant 51.

Examples of the base oil include mineral oil (refined mineral oil) such as paraffinic oil and naphthenic oil and synthetic oil such as polyolefine, ester, and silicone. Among these kinds of oil, one kind can be independently used or two or more kinds can be used in combination.

When the lubricant 51 includes the base oil and the thickening agent, the lubricant 51 desirably includes an additive such as an antioxidant, an extreme-pressure agent, or a corrosion prevention agent or solid lubricant such as black lead, molybdenum sulfide, or polytetrafluoro-ethylene (PTFE). Consequently, it is possible to easily obtain the lubricant 51 that can exhibit a high last non-seizure load and a high weld load for a long period.

In particular, the lubricant 51 desirably includes the extreme-pressure agent. Consequently, even if a lubrication target section falls into an extreme-pressure lubrication state, it is possible to effectively prevent seizure and scuffing. In particular, it is desirable to use an organic molybdenum compound and zinc dialkyldithiophosphate as the extreme-pressure agent.

Since the lubricant 51 includes the organic molybdenum compound, it is possible to effectively reduce friction in the lubrication target section. In particular, organic molybdenum exhibits an extreme pressure property and wear resistance equivalent to the extreme pressure property and the wear resistance of molybdenum sulfide. Moreover, the organic molybdenum is excellent in oxidation stability compared with the molybdenum sulfide. Therefore, it is possible to achieve an increase in the life of the lubricant 51. A content of the organic molybdenum compound in the lubricant 51 is desirably, for example, 1 percentage by mass or more and 5 percentage by mass or less. A content of zinc dialkyldithiophosphate in the lubricant 51 is desirably, for example, 1 percentage by mass or more and 5 percentage by mass or less.

Second Embodiment

A second embodiment of the invention is explained.

Figure 6:
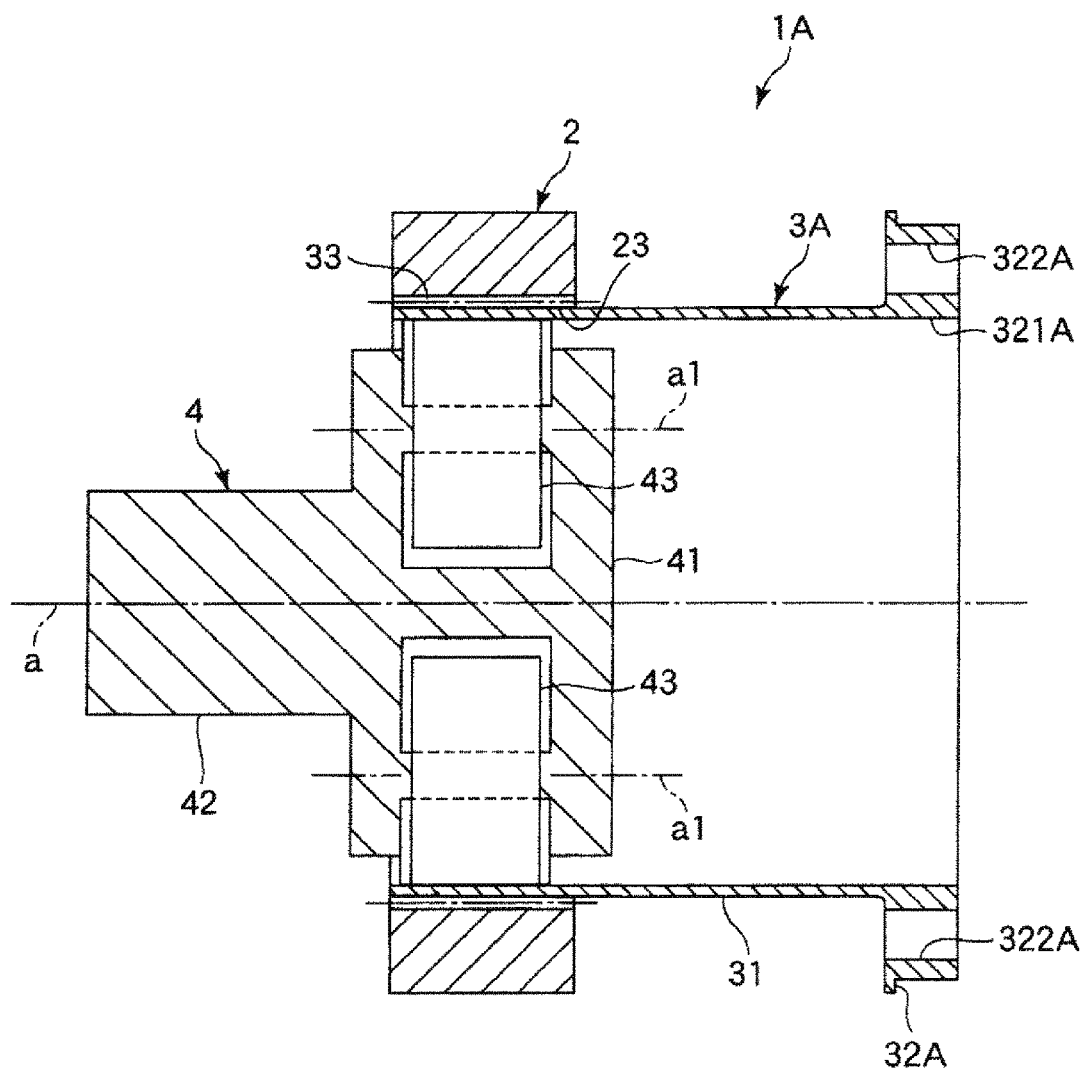
FIG. 6 is a longitudinal sectional view showing a gear device according to a second embodiment of the invention.

FIG. 6 is a longitudinal sectional view showing a gear device according to the second embodiment of the invention.

Note that, in the following explanation, concerning this embodiment, differences from the first embodiment are mainly explained. Concerning similarities, explanation of the similarities is omitted.

A gear device 1A shown in FIG. 6 includes a flexible gear 3A, which is a hat-type external gear disposed on the inner side of the rigid gear 2.

The flexible gear 3A includes a flange section 32A provided to project to the opposite side of the axis "a" on one end portion side in the axis "a" direction of the trunk section 31 formed in a tubular shape around the axis "a". With the flexible gear 3A having such a shape, as in the first embodiment, it is possible to realize satisfactory deflective meshing of the flexible gear 3A with the rigid gear 2. It is possible to stably connect an input shaft or an output shaft to the flange section 32A.

In this embodiment, a plurality of holes 322A piercing through the flange section 32A along the axis "a" are formed in the flange section 32A. The holes 322A can be used as screw holes through which screws for fixing a shaft body on the output side to the flange section 32A are inserted. The shaft body on the output side can be inserted through an inner circumferential section 321A of the flange section 32A.

In this way, the gear device 1A includes the rigid gear 2, which is an "internal gear", including the internal teeth 23, the flexible gear 3A, which is a flexible "external gear", including the external teeth 33 that partially mesh with the internal teeth 23, and the wave generator 4 that bends the flexible gear 3A and moves a meshing position of the rigid gear 2 and the flexible gear 3A in the circumferential direction. The gear device 1A includes the internal teeth 23 and the external teeth 33 that mesh with each other and the lubricant 51 disposed between the internal teeth 23 and the external teeth 33. As in the first embodiment, the average grain size of the constituent material of the external teeth 33 is smaller than the average grain size of the constituent material of the internal teeth 23.

According to the second embodiment explained above, as in the first embodiment, it is possible to effectively improve the lubrication life of the lubricant 51.

Third Embodiment

A third embodiment of the invention is explained.

Figure 7:
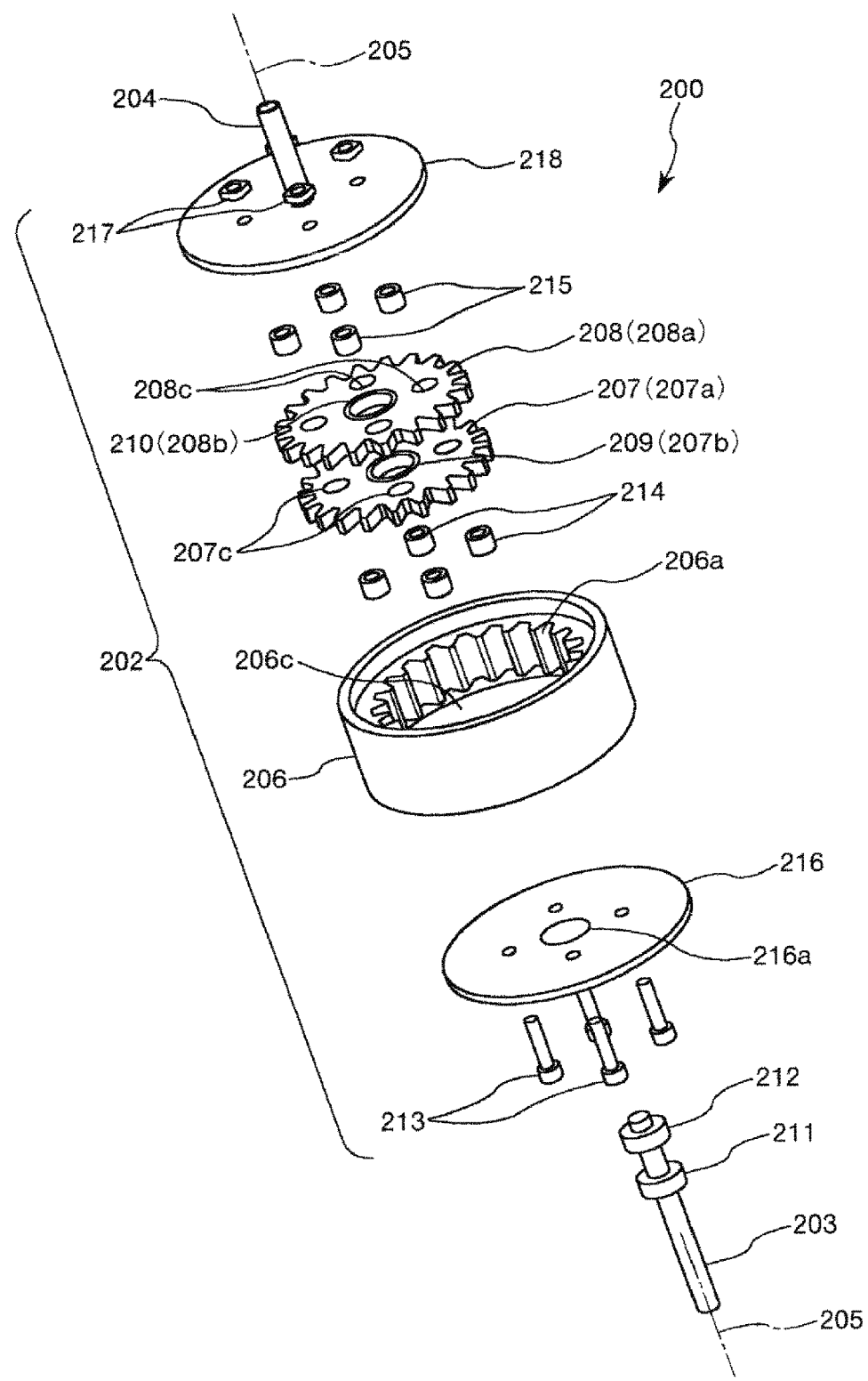
FIG. 7 is an exploded perspective view showing a gear device according to a third embodiment of the invention.
Figure 8:
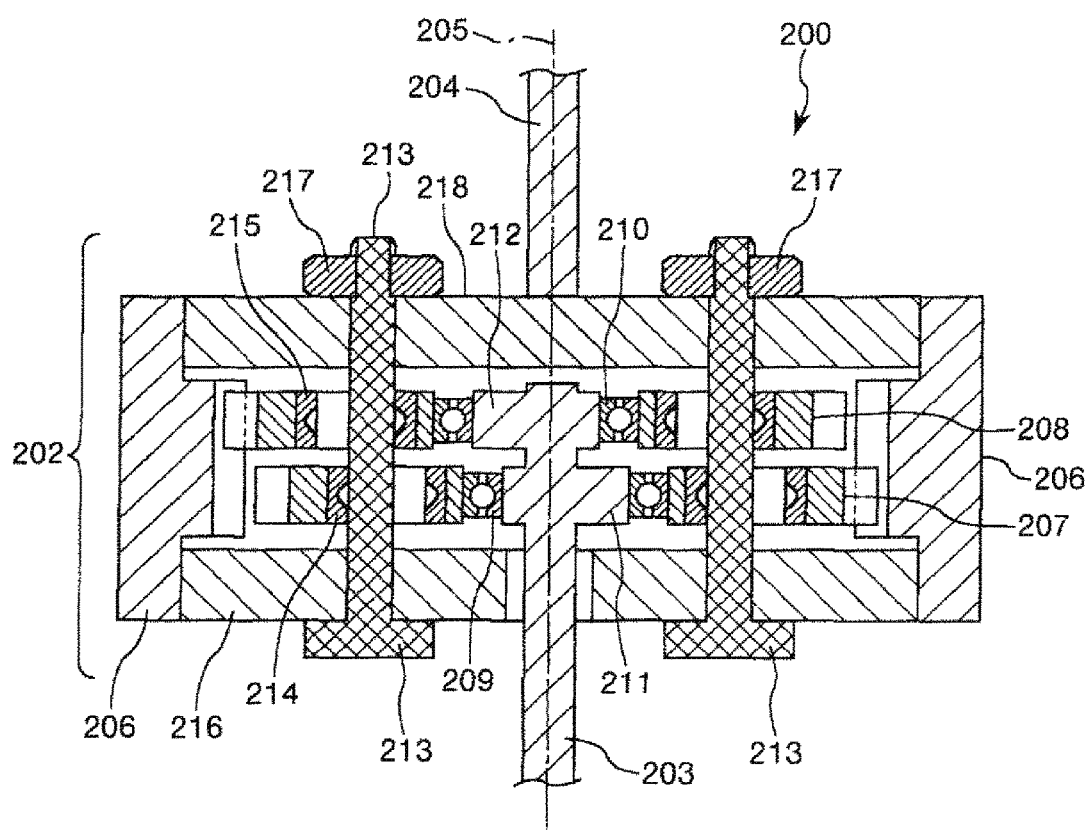
FIG. 8 is a longitudinal sectional view of the gear device shown in FIG. 7.

FIG. 7 is an exploded perspective view showing a gear device according to the third embodiment of the invention. FIG. 8 is a longitudinal sectional view of the gear device shown in FIG. 7.

Note that, in the following explanation, concerning this embodiment, differences from the embodiments explained above are mainly explained. Concerning similarities, explanation of the similarities is omitted.

A gear device 200 shown in FIGS. 7 and 8 includes a main body section 202 having a columnar external shape. A first rotating shaft 203 is provided on one side in the axial direction of the main body section 202. On the other hand, a second rotating shaft 204 is provided on the other side in the axial direction of the main body section 202. The first rotating shaft 203 and the second rotating shaft 204 turn around the same center axis 205. The center axis 205 is arranged on a line same as the axis of the main body section 202. When the first rotating shaft 203 is turned in a state in which the main body section 202 is fixed, the turn is decelerated by a mechanism in the main body section 202 explained below and output from the second rotating shaft 204. That is, the first rotating shaft 203 is an input shaft that rotates at high speed. The second rotating shaft 204 is an output shaft that rotates at low speed.

As shown in FIG. 7, the gear device 200 includes a cylindrical ring gear 206 including a hollow section 206c. A plurality of gear teeth 206a are formed on the inner circumference of the ring gear 206. A first revolving gear 207 and a second revolving gear 208 having outer circumferences slightly smaller than the inner circumference of the ring gear 206 are set on the inner side of the ring gear 206. A plurality of gear teeth 207a smaller in number than the number of teeth of the gear teeth 206a are disposed in the outer circumference of the first revolving gear 207. A plurality of gear teeth 208a same in number as the number of teeth of the gear teeth 207a are disposed in the outer circumference of the second revolving gear 208. The gear teeth 207a and the gear teeth 208a mesh with the gear teeth 206a.

A shaft hole 207b is provided in the center of the first revolving gear 207. Similarly, a shaft hole 208b is provided in the center of the second revolving gear 208. A first bearing 209 is set in the shaft hole 207b. Similarly, a second bearing 210 is set in the shaft hole 208b.

In the first rotating shaft 203, a first eccentric cam 211 and a second eccentric cam 212, which are circular cams eccentric by the same amount to opposite sides each other with respect to the center axis 205, are set. The first eccentric cam 211 is set in the inner ring of the first bearing 209. Similarly, the second eccentric cam 212 is set in the inner ring of the second bearing 210. Consequently, the center axis 205 is located between a portion where the gear teeth 207a mesh with the gear teeth 206a and a portion where the gear teeth 208a mesh with the gear teeth 206a.

In the first revolving gear 207, first through-holes 207c are provided in four places on a concentric circle centering on the center of the first revolving gear 207. Similarly, in the second revolving gear 208, second through-holes 208c are provided in four places on a concentric circle centering on the center of the second revolving gear 208. Through-pins 213 for extracting a movement of the rotation of the first revolving gear 207 are respectively inserted into the first through-holes 207c and the second through-holes 208c. Substantially cylindrical first elastic sections 214 having elasticity are fit in the inner circumferential walls of the first through-holes 207c by press-fitting. Similarly, substantially cylindrical second elastic sections 215 having elasticity are fit in the inner circumferential walls of the second through-holes 208c by press-fitting. The through-pins 213 pierce through the inner sides of the first elastic sections 214 or the second elastic sections 215.

The through-pins 213 are attached to a lower lid plate 216 having a disk shape on the first rotating shaft 203 side of the main body section 202 and fixed to an upper lid plate 218 having a disk shape by nuts 217 on the second rotating shaft 204 side. The lower lid plate 216 and the upper lid plate 218 are arranged along the axial direction of the center axis 205 and sandwich the ring gear 206 while leaving a gap to be capable of turning with respect to the ring gear 206.

A center hole 216a, into which the first rotating shaft 203 is inserted, is formed in the center of the lower lid plate 216. One end portion of the first rotating shaft 203 on the side of the first eccentric cam 211 and the second eccentric cam 212 projects into the main body section 202 from the lower lid plate 216. The other end portion of the first rotating shaft 203 projects to the outside of the main body section 202 from the lower lid plate 216. The second rotating shaft 204 is fixed to the center of the upper lid plate 218. Rotation torque of the upper lid plate 218 is transmitted to the second rotating shaft 204 according to the rotation of the upper lid plate 218.

Although not shown in the figure, lubricant same as the lubricant 51 in the first embodiment is disposed in a meshing portion of the ring gear 206, which is the "internal gear", and the first revolving gear 207 and the second revolving gear 208, which are the "external gears" in the gear device 200 configured as explained above. The average grain sizes of the constituent materials of the respective external teeth of the first revolving gear 207 and the second revolving gear 208 are smaller than the average grain size of the constituent material of the internal teeth of the ring gear 206.

According to the third embodiment explained above, as in the first and second embodiments, it is possible to effectively improve the lubrication life of the lubricant.

The robot and the gear devices according to the invention are explained above with reference to the embodiments shown in the figures. However, the invention is not limited to the embodiments. The components of the sections can be replaced with any components having the same functions. Any other components may be added to the invention. The embodiments may be combined as appropriate.

In the explanation in the embodiments, the base included in the robot is the "first member", the first arm is the "second member", and the gear device transmits a driving force from the first member to the second member. However, the invention is not limited to this. The invention is also applicable when an n-th (n is an integer equal to or larger than 1) arm is the "first member", a (n+1)-th arm is the "second member", and the gear device transmits a driving force from one side to the other side of the n-th arm and the (n+1)-th arm. The invention is also applicable when the gear device transmits a driving force from the second member side to the first member side.

In the embodiment, the six-axis vertical multi-joint robot is explained. However, the invention is not limited to this as long as a robot includes a gear device including a flexible gear. For example, the number of joints of the robot may be any number. The invention is also applicable to a horizontal multi-joint robot (a SCARA robot).

The invention is applicable to various gear devices including internal teeth and external teeth that mesh with each other. The configuration of the gear device is not limited to the configurations in the embodiments explained above. For example, the wave generator may have a form in which the outer circumferential wall of an inner ring is formed in an elliptical shape and an outer ring is formed in an elastically deformable thin shape in a ball bearing.

EXAMPLES

Specific examples of the invention are explained below.
1. Manufacturing of a Gear Device (a Reduction Gear)

Example 1

The gear device having the configuration shown in FIG. 2 was manufactured.

In the manufactured gear device, the outer diameter of the internal gear was ϕ60, the inner diameter of the internal gear and the outer diameter of the external gear (a meshing reference diameter) were ϕ45, and a reduction gear ratio was 50. Cast iron was used as the constituent material of the internal gear. Nickel-chrome molybdenum steel was used as the constituent material of the external gear. The average grain size (B) of the constituent material of the internal teeth of the internal gear was 20 μm. The average grain size (A) of the constituent material of the external teeth of the external gear was 0.5 μm.

Examples 2 to 13, Comparative Example

Gear devices were manufactured in the same manner as in the first embodiment except that the constituent materials of the internal gear and the external gear and the average grain sizes are as shown in Table 1.

TABLE 1

| | External gear | | Internal gear | | |
|---|---|---|---|---|---|
| | Constituent material | Average grain size (A) [μm] | Constituent material | Average grain size (B) [μm] | Evaluation Life [rotation] |
| Example 1 | SNCM439 | 0.5 | Cast iron | 20 | $1 \times 10^8$ |
| Example 2 | SNCM439 | 5 | Cast iron | 30 | $8 \times 10^7$ |
| Example 3 | SNCM439 | 20 | Cast iron | 50 | $5 \times 10^7$ |
| Example 4 | SNCM439 | 30 | Cast iron | 150 | $1 \times 10^7$ |
| Example 5 | Maraging steel | 10 | SUS630 | 30 | $5 \times 10^7$ |
| Example 6 | Maraging steel | 20 | SUS630 | 50 | $4 \times 10^7$ |
| Example 7 | Maraging steel | 30 | SUS630 | 140 | $2 \times 10^7$ |
| Example 8 | SUS630 | 5 | Cast iron | 20 | $9 \times 10^7$ |
| Example 9 | SUS630 | 15 | Cast iron | 50 | $5 \times 10^7$ |
| Example 10 | SUS630 | 30 | Cast iron | 150 | $1 \times 10^7$ |
| Example 11 | SNCM439 | 40 | Cast iron | 50 | $5 \times 10^5$ |
| Example 12 | SNCM439 | 30 | Cast iron | 160 | $3 \times 10^5$ |
| Example 13 | SNCM439 | 0.3 | Cast iron | 20 | $1 \times 10^7$ |
| Comparative example | SNCM439 | 30 | Cast iron | 20 | $6 \times 10^4$ |

Note that, in Table 1, SNCM439 is nickel-chrome molybdenum steel. SUS630 is precipitation hardening type stainless steel. The cast iron is ductile cast iron.
2. Evaluation In the gear devices obtained by the manufacturing explained in 1 above, continuous operation was performed at an input-shaft number of revolution of 2000 rpm and load torque of 1000 Nm and life (an input-shaft total number of revolutions with a failure probability of 50%) was measured. A result of the measurement is also shown in Table 1.

As it is evident from Table 1, it is seen that the life is markedly long in the examples compared with the comparative example.

The entire disclosures of Japanese Patent Application No. 2016-149796, filed Jul. 29, 2016 and No. 2017-096344, filed May 15, 2017 are expressly incorporated by reference herein.

What is claimed is:

1. A robot comprising:

a first member;

a second member turnably connected to the first member; and a gear device configured to transmit a driving force between the first member and the second member, wherein the gear device includes:

internal teeth and external teeth provided halfway in a transmission path of the driving force and configured to mesh with each other; and lubricant disposed between the internal teeth and the external teeth, and an average grain size of a constituent material of the external teeth is smaller than an average grain size of a constituent material of the internal teeth, the external teeth have a larger retaining property of the lubricant thereon than the internal teeth, the constituent material of the internal teeth is cast iron, and the constituent material of the external teeth is nickel-chrome molybdenum steel.

2. The robot according to claim 1, wherein the average grain size of the constituent material of the internal teeth is within a range of 20 μm or more to 150 μm or less.

3. The robot according to claim 1, wherein the average grain size of the constituent material of the external teeth is within a range of 0.5 μm or more to 30 μm or less.

4. The robot according to claim 1, wherein the gear device includes:

an internal gear including the internal teeth;

a flexible external gear including the external teeth that partially mesh with the internal gear; and a wave generator configured to bend the external gear and move a meshing position of the internal gear and the external gear in a circumferential direction.

5. A gear device comprising:

an internal teeth and an external teeth configured to mesh with each other; and lubricant disposed between the internal teeth and the external teeth, wherein an average grain size of a constituent material of the external teeth is smaller than an average grain size of a constituent material of the internal teeth, the external teeth have a larger retaining property of the lubricant thereon than the internal teeth, the constituent material of the internal teeth is cast iron, and the constituent material of the external teeth is nickel-chrome molybdenum steel.

* * * * *